April 19, 1938. J. S. DISMUKES 2,114,558
WINDSHIELD CLEANING APPARATUS
Filed March 4, 1937 3 Sheets-Sheet 1
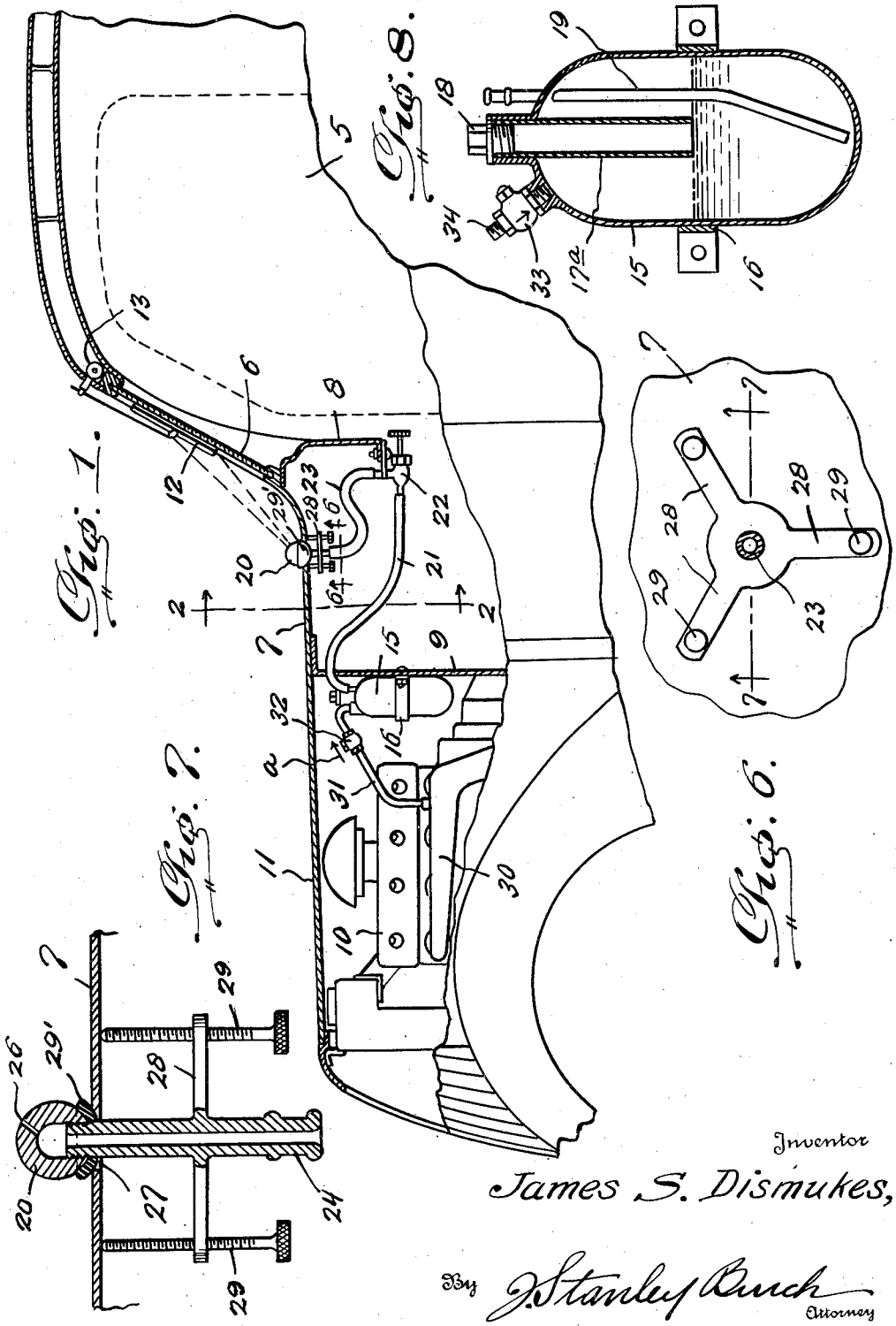
Inventor
James S. Dismukes,
By J. Stanley Burch
Attorney April 19, 1938. J. S. DISMUKES 2,114,558
WINDSHIELD CLEANING APPARATUS
Filed March 4, 1937 3 Sheets-Sheet 2
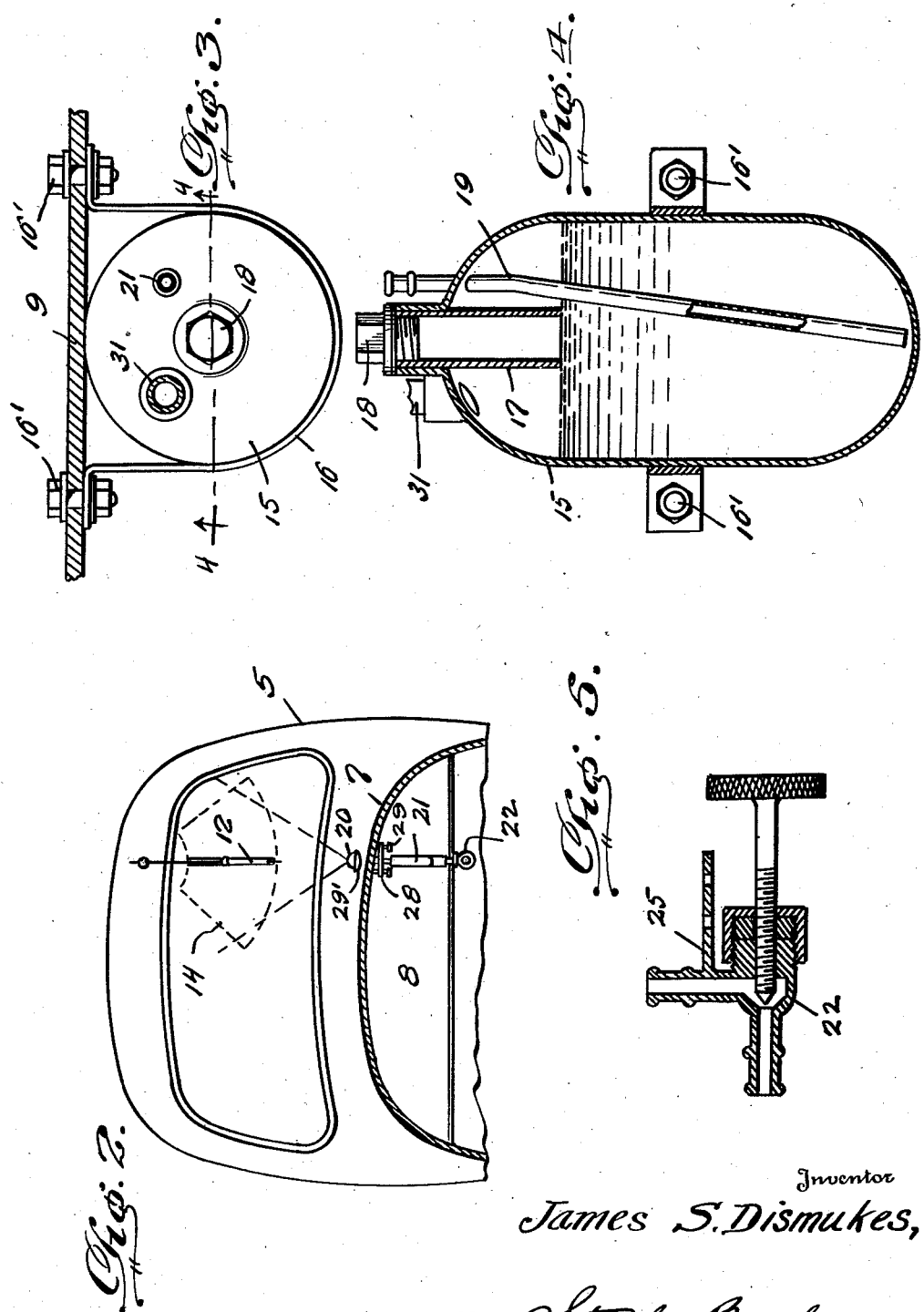
Inventor
James S. Dismukes,
By J. Stanley Burch
Attorney

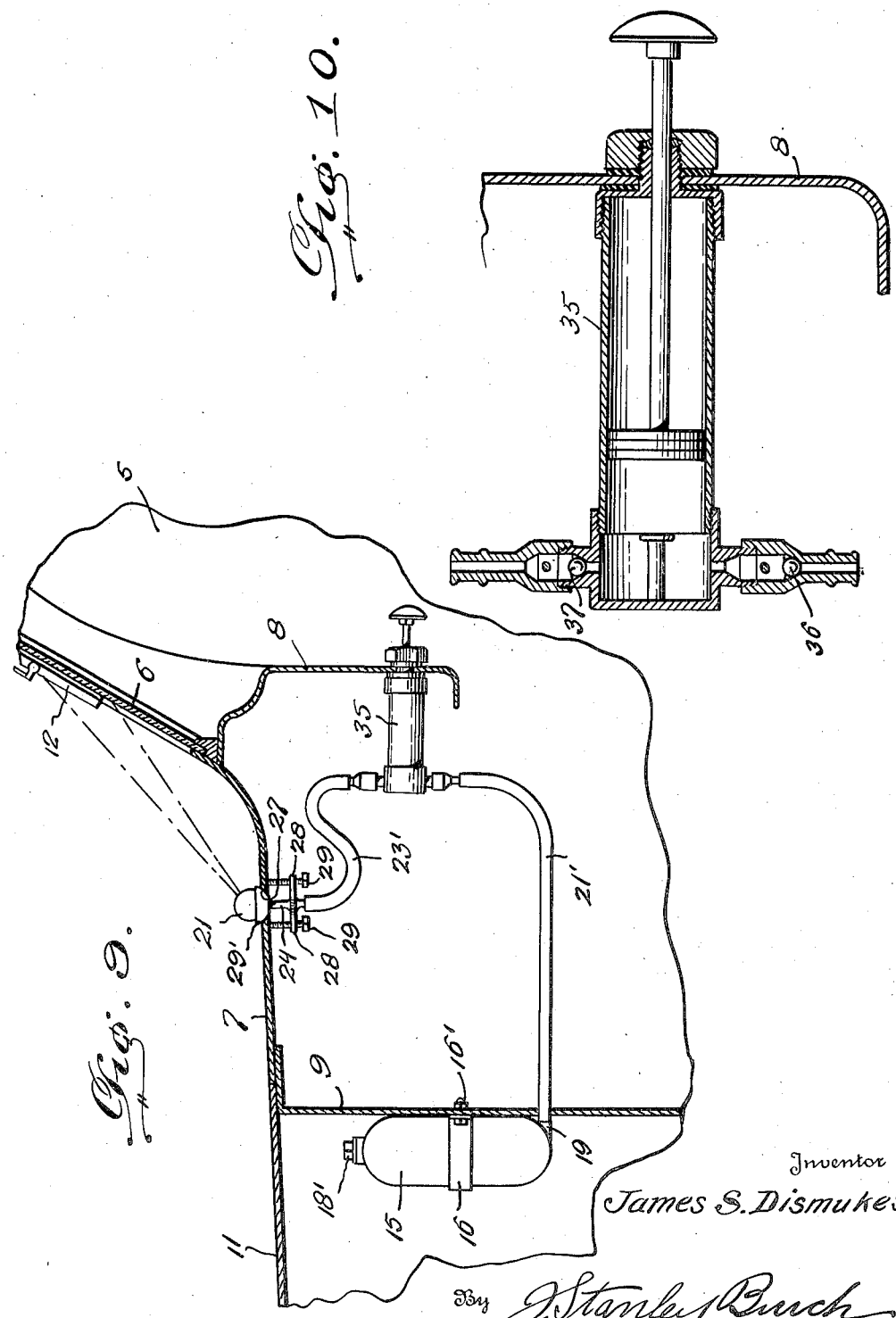

Patented Apr. 19, 1938

2,114,558

UNITED STATES PATENT OFFICE 2,114,558

WINDSHIELD CLEANING APPARATUS

James S. Dismukes, Nacogdoches, Tex.

Application March 4, 1937, Serial No. 129,078

3 Claims. (Cl. 20—40.5)

This invention relates to windshield cleaning apparatus for automobiles, and has more particular reference to a device for spraying water or other cleaning liquid upon the outer surface of an automobile windshield in the path of movement of an ordinary windshield wiper, whereby such windshield wiper may be employed whenever desired to clean a portion of the windshield surface to provide clear vision.

An object of the present invention is to provide a spraying device of the above kind which is extremely simple in construction, efficient in operation, and easy and economical to manufacture and install.

A more particular object of the present invention is to provide a spraying device of the above kind including a reservoir for the water or cleaning liquid, a nozzle for discharging the water or cleaning liquid onto the desired portion of the windshield, a discharge line connecting the reservoir with the nozzle, and provided with a control valve operable from the driver's seat of the automobile, and means to facilitate placing the water or cleaning liquid in the reservoir under gaseous pressure so that the desired quantity of the water or cleaning liquid will be discharged onto the windshield upon opening the control valve in the discharge line.

A further specific object of the present invention is to provide a novel form of discharge nozzle adjustably mounted on the cowl of the automobile so that the spray of water or cleaning liquid will be properly directed on the desired portion of the windshield regardless of the particular design or make of the automobile upon which the device is installed.

With the above general objects in view, and others that will appear as the nature of the invention is better understood, said invention consists in the novel form, combination and arrangement of parts hereinafter more fully described, shown in the accompanying drawings, and claimed.

In the drawings:

Figure 1 is a fragmentary longitudinal sectional view of an automobile equipped with a spraying device in accordance with the present invention.

Figure 2 is a fragmentary section taken substantially on line 2—2 of Figure 1.

Figure 3 is an enlarged fragmentary view partly in top plan and partly in horizontal section, showing the reservoir for the water or cleaning liquid and the means for mounting said reservoir on the dash of the automobile.

Figure 4 is a vertical section on line 4—4 of Figure 3.

Figure 5 is an enlarged sectional view of the control valve provided in the discharge line.

Figure 6 is an enlarged view taken on line 6—6 of Figure 1 and looking upwardly at the mounting for the discharge nozzle.

Figure 7 is a vertical section on line 7—7 of Figure 6.

Figure 8 is a view similar to Figure 4 of a modified form of reservoir for the water or cleaning liquid.

Figure 9 is a view somewhat similar to Figure 1, showing a modified form of spraying device embodying the present invention; and Figure 10 is an enlarged fragmentary sectional view, showing the hand pump employed in Figure 9.

Referring in detail to the drawings, the present invention is shown in connection with a conventional automobile having a closed body 5, a windshield 6, a cowl 7, an instrument board 8, a dash 9, an internal combustion engine 10 furnishing the power by means of which the automobile is driven, and a hood 11 for said internal combustion engine. As usual, the automobile is equipped with a conventional windshield wiper 12 operated by a suction motor 13 for keeping a portion of the outer surface of the windshield clear in inclement weather as indicated by dotted lines at 14 in Figure 2. While the wiper 12 is efficient for wiping the windshield portion 14 clear in inclement weather, it will not wipe dry dirt from the outer surface of the windshield in clear weather unless the portion of the windshield surface traversed by the wiper 12 is supplied in some way with water or other cleaning liquid. The purpose of the present invention is to provide a device for spraying water or cleaning liquid onto the portion 14 of the windshield for cleaning the latter whenever desired, such device being controllable from the driver's seat of the automobile.

As shown, the present device consists of a suitable tank 15 affording a reservoir for water or other cleaning liquid and preferably mounted on and at the front of the dash 9 within the engine hood 11, such as by means of a clamping band 16 tightly embracing the tank 15 and secured at its ends to the dash 9 by bolts 16'. The tank 15 in Figures 1 and 4 has a top filler pipe 17 through which the supply of water or cleaning liquid in the tank 15 may be replenished from time to time as found necessary. The filler pipe 17 is provided at the top with a removable closure plug 18, and this filler pipe projects a suitable distance downwardly within the body of the tank 15 so as to provide an air trap in surrounding relation thereto for limiting the level at which the tank may be filled with the water or cleaning liquid. This is provided so that a material upper portion of the tank may be utilized to contain a gas or air under pressure which is adapted to act upon the surface of the water or cleaning liquid for the purpose of discharging such water or liquid from the tank when desired and in a manner which will presently become apparent.

The tank 15 is provided with a discharge pipe 19 having its inlet end disposed within and adjacent the bottom of the tank 15 as shown clearly in Figure 4. The upper or outlet end of the discharge pipe 19 is connected by a discharge line with a discharge nozzle 20, such discharge line including a tube 21 connecting the discharge pipe 19 with the inlet of a control valve 22, and a flexible pipe 23 connecting the outlet of valve 22 with the inlet stem 24 of the nozzle 20. The valve 22 may be of any desired or preferred type or construction, but has been shown as an ordinary needle valve provided with a bracket 25 to facilitate rigidly securing the same to the instrument board 8 in a position from which the valve 22 may be conveniently controlled or operated by the driver occupying the driver's seat of the automobile. Obviously, by closing the valve 22 the discharge of water or cleaning liquid from tank 15 may be prevented at will, and by opening valve 22 the water or cleaning liquid may be allowed to pass from tank 15 to and outwardly through the nozzle 20 onto the portion 14 of the windshield 6. The nozzle 20 has a suitable opening or suitable openings as at 26 so that the water or cleaning liquid will be discharged from said nozzle 20 onto the windshield 6 in a fan-like spray for effectively wetting practically the entire portion 14 of the windshield surface traversed by the wiper 12.

As shown, the nozzle 20 is of spherical form and rests upon the cowl 7 at a point where the latter is provided with an opening 27 downwardly through which the inlet stem 24 of said nozzle 20 extends. The stem 24 is considerably smaller than the opening 27 so that said stem is free to move laterally in all directions for permitting universal adjustment of nozzle 20. In this way, the nozzle 20 may be properly positioned to direct the spray on the proper portion of the windshield 6. This enables convenient installation of the nozzle 20 upon the cowl of various makes of automobiles. In order to secure and maintain this adjustment of nozzle 20, the stem 24 is provided with a plurality of radial arms 28 through each of which is adjustably threaded an adjusting screw 29 arranged to bear against the under side of the cowl 7. The adjusting screws 29 are uniformly spaced apart about the stem 24, and by relatively adjusting the screws 29 with respect to each other and with respect to their associated arms 28, the proper adjustment of nozzle 20 may be had and secured. A suitable gasket 29' may be provided on the stem 24 between the cowl 7 and the lower portion of nozzle 20 to secure a water tight joint where the stem 24 passes through the cowl 7.

As before stated, the tank 15 is provided with means to facilitate supply of a gas or air under pressure into the upper portion thereof for placing the water or cleaning liquid in the tank 15 under pressure, so that such water or cleaning liquid will be discharged from tank 15 through nozzle 20 onto the windshield 6 when the valve 22 is opened. The gas or air under pressure for this purpose may be derived from any suitable source, or it may be stored in the upper portion of the tank 15. I prefer to provide the tank 15 with a top air or gas inlet opening, connecting the gas or inlet opening with the exhaust manifold 30 of the engine 10 by means of a pipe 31 in which is provided a check valve 32 adapted to open under pressure in the direction indicated by the arrow $a$ in Figure 1. Thus, when the engine 10 is running, there will be exhaust gases under pressure in the manifold 30, part of which may pass through the pipe 31 into the top of tank 15 for placing the water or cleaning liquid in tank 15 under pressure. Thus, any time the valve 22 is opened a desired quantity of water or cleaning liquid will be discharged from tank 15 through nozzle 20 onto the windshield 6 in the path of the windshield wiper 12 so that the latter may effectively wipe dried dirt from the portion 14 of the windshield traversed by said wiper 12. When sufficient water or cleaning fluid has been supplied to the windshield, the discharge of the water or cleaning liquid may be discontinued by simply closing the valve 22 from the driver's seat of the automobile.

Should it be desired to simply partially fill the tank 15 with the water or cleaning fluid and then provide the remaining upper portion of the tank with air or gas under pressure, the filler pipe of tank 15 is preferably made relatively long as shown at 17a in Figure 8. A considerable quantity of air or gas under pressure may thus be stored in the upper portion of tank 15 so that it will be unnecessary to permanently connect the same with a source of air or gas under pressure as in Figures 1 to 7 inclusive. In this event, the air or gas inlet may consist of a check valve 33 having a threaded inlet end 34 to facilitate detachable connection thereof with a source of air under pressure. In other words, the check valve 33 will be somewhat similar to the ordinary inflation valve of a pneumatic vehicle wheel, thus permitting replenishment of the supply of air under pressure in the upper portion of tank 15 at any service station. Otherwise, the device employing the tank of Figure 8 will not differ in any respects from the complete device as illustrated in Figure 1. One possible advantage of using a tank such as illustrated in Figure 1 is that the device does not depend for its operation upon the simultaneous operation of the automobile engine 10. In other words, the air or gas will be stored under pressure in the upper portion of the tank shown in Figure 8 so that it will act to discharge the water or cleaning liquid from tank 15 whenever the control valve 22 is operated, even though the engine 10 is not running. Should the air or gas under pressure be derived from a mechanical pump operated by engine 10 or from the exhaust manifold 30 as shown in Figure 1, it will be necessary to have the engine 10 running in order to make use of the device, the supply of air or gas under pressure then being entirely dependent upon operation of the engine 10.

In the form of Figures 9 and 10, the tank 15 is not supplied with air or gas under pressure, and is simply provided with a top filler opening closed by a plug 18' and a bottom outlet 19'. The outlet 19' is connected by a pipe 21' with the inlet nipple of a single-acting hand pump 35, mounted on the instrument board 8 so as to be operable from the driver's seat of the automobile.

The outlet nipple of pump 35 is connected by a flexible pipe 23' with the inlet stem 24 of nozzle 20. The inlet and outlet nipples of pump 35 have the necessary check valves 36 and 37, so that a charge of liquid will be drawn into the cylinder of pump 35 when the piston of the latter is retracted and such charge will be forced from the cylinder of pump 35 through pipe 23' and nozzle 20 when said piston is projected.

From the foregoing description, it will be seen that I have provided a device for the intended purpose which is simple and economical to manufacture, easy to install, and efficient in use. The device supplies a great need by providing for instant cleaning of the desired portion of the windshield surface in clear weather when driving or when some distance from a service station. The device is under control of the driver of the automobile who need not leave his seat in order to obtain a supply of water and discharge the latter onto the windshield.

It will be apparent that the invention is susceptible to various minor changes and modifications without departing from the spirit and scope of the invention as claimed.

What I claim as new is:

1. In a device for spraying a cleaning liquid onto the portion of the windshield of an automobile traversed by a windshield wiper, the combination with the cowl of the automobile having an opening, a discharge nozzle of spherical form and having an inlet stem loosely extending downwardly through said opening, and means carried by said inlet stem and cooperating with said cowl for effecting universal adjustment of said nozzle for causing the cleaning liquid to be discharged from said nozzle onto the desired portion of the windshield surface.

2. In a device for spraying a cleaning liquid onto the portion of the windshield of an automobile traversed by a windshield wiper, a discharge nozzle having a depending inlet stem extending downwardly through a part of the automobile in front of the windshield and provided with a plurality of radial arms, and adjusting screws carried by said arms and engaging the under surface of said part for effecting universal adjustment of said nozzle with respect to the latter, whereby the cleaning liquid may be discharged by said nozzle onto the desired portion of the windshield surface.

3. In a device for spraying a cleaning liquid onto the portion of the windshield of an automobile traversed by a windshield wiper, a nozzle mounted on the cowl of the automobile, the cowl of the automobile having an opening, said nozzle being of spherical form and having an inlet stem loosely depending through said opening, and means associated with said stem and said cowl for effecting universal adjustment of said nozzle.

JAMES S. DISMUKES.